(12) United States Patent
Repasi et al.

(10) Patent No.: US 8,028,301 B2
(45) Date of Patent: *Sep. 27, 2011

(54) RESTRICTING RECORDAL OF USER ACTIVITY IN A PROCESSING SYSTEM

(75) Inventors: Rolf Repasi, Sunrise Beach (AU); Simon Clausen, Sydney (AU)

(73) Assignee: Symantec Corporation, Mountain View, CA (US)

( * ) Notice: Subject to any disclaimer, the term of this patent is extended or adjusted under 35 U.S.C. 154(b) by 1279 days.

This patent is subject to a terminal disclaimer.

(21) Appl. No.: 11/370,827

(22) Filed: Feb. 24, 2006

(65) Prior Publication Data

US 2006/0206937 A1 Sep. 14, 2006

Related U.S. Application Data

(60) Provisional application No. 60/661,695, filed on Mar. 14, 2005.

(30) Foreign Application Priority Data

Mar. 14, 2005 (AU) .............................. 2005901221

(51) Int. Cl.
G06F 9/44 (2006.01)
H04L 29/06 (2006.01)
(52) U.S. Cl. ........................ 719/328; 719/318; 726/22
(58) Field of Classification Search .................. 345/163, 345/168; 713/164, 167; 719/327, 328, 318; 726/24, 28, 22

See application file for complete search history.

(56) References Cited

U.S. PATENT DOCUMENTS

| | | | |
|---|---|---|---|
| 7,263,721 B2 * | 8/2007 | Kelley et al. | 726/23 |
| 7,523,470 B2 * | 4/2009 | Garvey et al. | 719/328 |
| 2002/0174359 A1 * | 11/2002 | Haltmeyer | 713/200 |
| 2004/0187023 A1 * | 9/2004 | Alagna et al. | 713/200 |
| 2004/0215971 A1 * | 10/2004 | Nam | 713/200 |
| 2005/0120242 A1 * | 6/2005 | Mayer et al. | 713/201 |
| 2005/0177649 A1 * | 8/2005 | Geon et al. | 710/1 |
| 2006/0015940 A1 * | 1/2006 | Zamir et al. | 726/22 |
| 2006/0085528 A1 * | 4/2006 | Thomas | 709/223 |
| 2006/0101277 A1 * | 5/2006 | Meenan et al. | 713/182 |
| 2006/0179484 A1 * | 8/2006 | Scrimsher et al. | 726/23 |

* cited by examiner

*Primary Examiner* — H. S. Sough
*Assistant Examiner* — Charles E Anya
(74) *Attorney, Agent, or Firm* — Holland & Hart LLP

(57) ABSTRACT

A method/system for restricting recordal of user activity in a processing system. In one form, the method comprises intercepting a kernel API call of the processing system 100, determining if a process initiating the kernel API call is malicious, and in response to a positive determination, terminating the determined process. A table can be updated with request information of the process and it can be determined if a trend of requests exists for the status of the input device, and in response to a positive determination of a trend, the process may be terminated.

20 Claims, 15 Drawing Sheets

RESTRICTING RECORDAL OF USER ACTIVITY IN A PROCESSING SYSTEM

CROSS-REFERENCE TO RELATED APPLICATIONS

This application claims the benefit of priority from Provisional Application Ser. No. 60/661,695, entitled Method And System For Preventing Recordation Of User Activity In A Processing System, and filed on Mar. 14, 2005. Provisional Application Ser. No. 60/661,695 is hereby incorporated by reference in its entirety.

TECHNICAL FIELD

The present invention generally relates to a method, system and/or computer readable medium of instructions for restricting recordal of user activity in a processing system, and more particularly to a method, system and/or computer readable medium of instructions for restricting or preventing user performed keystrokes and/or mouse actions to be recorded by a software program or device, such as, for example, keylogger software.

BACKGROUND ART

Definitions

A keylogger, as used herein, refers to software or hardware that is designed to record and/or store keystrokes which a user types on a keyboard of a processing system. A keylogger can be designed to be unobtrusive or hidden to the user and usually operates without the knowledge of the user. By recording keystrokes, a keylogger may transfer such recorded details to another person or entity, wherein the details may comprise usernames, passwords or credit card details. This information may then be used to the detriment of the user of the processing system, without their knowledge.

A keylogger blocker, as used herein, refers to software or hardware that is designed to restrict a keylogger from operating normally or recording keystrokes made by a user.

A hook (also known as a hook procedure or hook function), as used herein, generally refers to a callback function provided by a software application that receives certain data before the normal or intended recipient of the data. A hook function can thus examine or modify certain data before passing on the data. Therefore, a hook function allows a software application, such as a keylogger, to examine data such as keystrokes before the data is passed to the intended recipient.

An API ("Application Programming Interface") hook (also known as an API interception), as used herein as a type of hook, refers to a callback function provided by an application that replaces functionality provided by an operating system's API. An API generally refers to an interface that is defined in terms of a set of functions and procedures, and enables a program to gain access to facilities within an application. An API hook can be inserted between an API call and an API procedure to examine or modify function parameters before passing parameters on to an actual or intended function. An API hook may also choose not to pass on certain types of requests to an actual or intended function.

A process, as used herein, is at least one of a running software program or other computing operation, or a part of a running software program or other computing operation, that performs a task.

A hook chain (Microsoft Windows™ specific definition), as used herein, is a list of pointers to special, application-defined callback functions called hook procedures. When a message occurs that is associated with a particular type of hook, Microsoft Windows™ passes the message to each hook procedure referenced in the hook chain, one after the other. The action a hook procedure can take depends on the type of hook involved. For example, the hook procedures for some types of hooks can only monitor messages, others can modify messages or stop their progress through the chain, restricting them from reaching the next hook procedure or a destination window.

A kernel, as used herein, refers to the core part of an operating system, responsible for resource allocation, low-level hardware interfaces, security, etc.

An interrupt, as used herein, is at least one of a signal to a processing system that stops the execution of a running program so that another action can be performed, or a circuit that conveys a signal stopping the execution of a running program.

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive.

An information source can comprise a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

BACKGROUND

Presently, there are two known categories of keylogger blockers: signature based and behaviour based.

A signature based keylogger blocker relies on a database of signatures for known keylogger software. Signatures are collections of information which contain a description of keylogger software, and may comprise characteristics such as file size, file name, a cryptographic hash or checksum, or pseudo code which represents program flow.

These signatures are read by the keylogger blocker and used to determine whether or not to allow execution of a suspected process. A problem with signature based keylogger blockers is that they require constant maintenance and updating of the signature database in order to be effective. Signature based keylogger blockers do not restrict the operation of a keylogger which is not covered in the signature database.

A behaviour based keylogger blocker attempts to restrict keylogger software from functioning correctly by examining behaviour of keylogger software and restricting 'suspicious' activity. Currently available behaviour based keylogger blockers can restrict some known and unknown keyloggers from recording keystrokes, however currently known behaviour based keylogger blockers are not sufficient to stop keylogger software from establishing a hook in the hook chain, and thus these keylogger blocker programs may be easily bypassed by keyloggers. Additionally, currently known behaviour based keylogger blockers fail to restrict or terminate a keylogger's process and notify a user in real-time.

Referring to FIG. 1, there is illustrated a system structure used by presently known keylogger blockers. On start-up, this system structure installs a system wide keyboard hook onto the hook chain (C). Whenever a particular hook is called which the keylogger blocker wishes to restrict propagating through the hook chain, the next hook in the chain (E) is not called, or a system buffer containing keystates is cleared. This method restricts information propagating to all other installed hooks, such as keyboard hooks. However, this restriction of the propagation of information is risky as other hooks further down the hook chain may not receive required data, and may subsequently stall an operating system running on the processing system.

There exists a need for a method, system and/or computer readable medium of instructions to at least restrict or prevent the recordal of keystrokes and/or mouse actions which address or at least ameliorate problems inherent in the prior art.

The reference to any prior art in this specification is not, and should not be taken as, an acknowledgment or any form of suggestion that such prior art forms part of the common general knowledge.

DISCLOSURE OF INVENTION

According to a first broad form, the present invention provides a method of restricting recordal of user activity in a processing system, the method comprising:
intercepting a kernel API call of the processing system;
determining if a process initiating the kernel API call is malicious; and
in response to a positive determination, terminating the process.

Preferably, but not necessarily, the method comprises performing behavioural analysis of the process to determine if the process is malicious.

Also preferably, but not necessarily, determining if the process is malicious comprises checking if the API call is related to a user interface.

In particular, but non-limiting, forms, determining if the process is malicious comprises checking if the API call is related to a graphical user interface. In one form, determining if the process is malicious comprises checking if the process comprises a hidden window.

In another particular, but non-limiting, form, determining if the process is malicious comprises comparing the process to one or more signatures of known keylogger programs.

In accordance with a specific optional embodiment, in response to a positive determination of a malicious process, the method comprises identifying the process.

Optionally, the process is identified by at least one of: a name of the process; a process identity; a user with which the process is associated; a time the process was initiated; a parent process identity number; a processing cycle for the process; and/or, one or more associated open port numbers.

According to one embodiment, prior to the process being terminated, the method comprises prompting a user to authorise the termination of the process.

According to another non-limiting embodiment, the method comprises generating a file comprising data related to the process; and storing the file in a storage device.

According to a second broad form, the present invention provides a processing system for restricting recordal of user activity in the processing system, comprising:
means to intercept a kernel API call of the processing system;
means to determine if a process initiating the kernel API call is malicious; and,
means to terminate the process in response to a positive determination.

According to a third broad form, the present invention provides a method of restricting recordal of user activity in a processing system, the method comprising:
intercepting an input device API call;
determining if a process initiating the input device API call is requesting a state of the input device; and
in response to a positive determination:
updating a table with request information of the process;
determining if a trend exists for requests; and
in response to a positive determination of a trend, terminating the process.

In one non-limiting embodiment, the method comprises intercepting the API call for at least one of the following input devices: a keyboard; and/or a mouse.

In another non-limiting embodiment, in response to a positive determination of the process requesting the state of the input device, the method comprises identifying the process.

Optionally, the process is identified by at least one of: a name of the process; a process identity; a user with which the process is associated; a time the process was initiated; a parent process identity number; a processing cycle for the process; and/or, one or more associated open port numbers.

In one particular, but non-limiting, form, the request information comprises at least one of: the name of the process; the process identity; the user with which the process is associated; the time the process was initiated; the parent process identity number; associated processing cycles for the process; and/or one or more associated open port numbers.

Optionally, the method comprises:
performing a behavioural analysis of the process by determining if a trend exists based on whether the process is polling the state of the input device at least one of:
constantly; and
at regular intervals.

In another non-limiting embodiment, prior to the process being terminated, the method comprises prompting a user to authorise the termination of the process.

Optionally, the method comprises generating a file comprising data related to the process; and storing the file in a storage device.

According to a fourth broad form, the present invention provides a processing system for restricting recordal of user activity in the processing system, comprising:
means to intercept an input device API call;
means to determine if a process initiating the input device API call is requesting a state of the input device; and
in response to a positive determination:
means to update a table with request information of the process;
means to determine if a trend exists for requests; and
means to terminate the process in response to a positive determination of a polling process.

According to a fifth broad form, the present invention provides a method of restricting recordal of user activity in a processing system, the method comprising:

intercepting a kernel device driver API call of the processing system;

determining if a process initiating the kernel device driver API is attempting to perform an activity comprising at least one of:

replacement of an input device driver;

modification of an input device driver; and deletion of an input device driver; and in response to a positive determination, restricting the process performing the activity.

In one particular, but non-limiting, form, the method comprises intercepting the kernel device driver API call for at least one of the following input devices: a keyboard; and/or, a mouse.

Optionally, the method comprises determining if a user prompt is to be displayed to a user warning the user of the process attempting to perform the activity.

In one non-limiting embodiment, the user prompt requests a response indicating whether the process is permitted to perform the activity, and the method comprises receiving response data indicating whether the user has permitted the activity to be performed by the process.

According to a sixth broad form, the present invention provides a processing system for restricting recordal of user activity in the processing system comprising:

means to intercept an kernel device driver API call of the processing system;

means to determine if a process initiating the kernel device driver API call is attempting to perform an activity comprising at least one of:

a replacement of an input device driver;

a modification of an input device driver; and deletion of an input device driver; and means to restrict the process performing the activity in response to a positive determination.

According to a seventh broad form, the present invention provides a method of restricting recordal of user activity in a processing system, the method comprising:

monitoring an interrupt structure within a kernel of the processing system;

determining if a process is attempting to alter an input device interrupt related to the interrupt structure; and in response to a positive determination, restricting the alteration to the input device interrupt.

In one particular, but non-limiting form, the method comprises intercepting a hook for writing to kernel structures.

In one particular embodiment, the method comprises:

making a copy of the kernel structure;

storing the copy of the kernel structure in a global internal table;

comparing the global internal table to the kernel structure; and, based on the results on the comparison, determining whether the process is attempting to alter an input device interrupt related to the monitored interrupt structure.

Optionally, the method comprises notifying a user that the process has been restricted.

In another embodiment, the method comprises:

making a copy of the kernel structure;

storing the copy of the kernel structure in a global internal table;

storing the copy of the kernel structure in a temporary table;

comparing the global internal table to the temporary table; and in response to a discrepancy between the global internal table and the temporary table, copying the global internal table to the kernel structure.

According to an eighth broad form, the present invention provides a processing system for restricting recordal of user activity in the processing system, comprising:

means to monitor an interrupt structure within a kernel of the processing system;

means to determine if a process is attempting to alter an input device interrupt related to the monitored interrupt structure; and means to restrict the alteration of the input device interrupt in response to a positive determination.

According to a ninth broad form, the present invention provides a computer readable medium of instructions for giving effect to any of the aforementioned methods or systems. In one particular, but non-limiting, form, the computer readable medium of instructions are embodied as a software program.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

Figure 1:
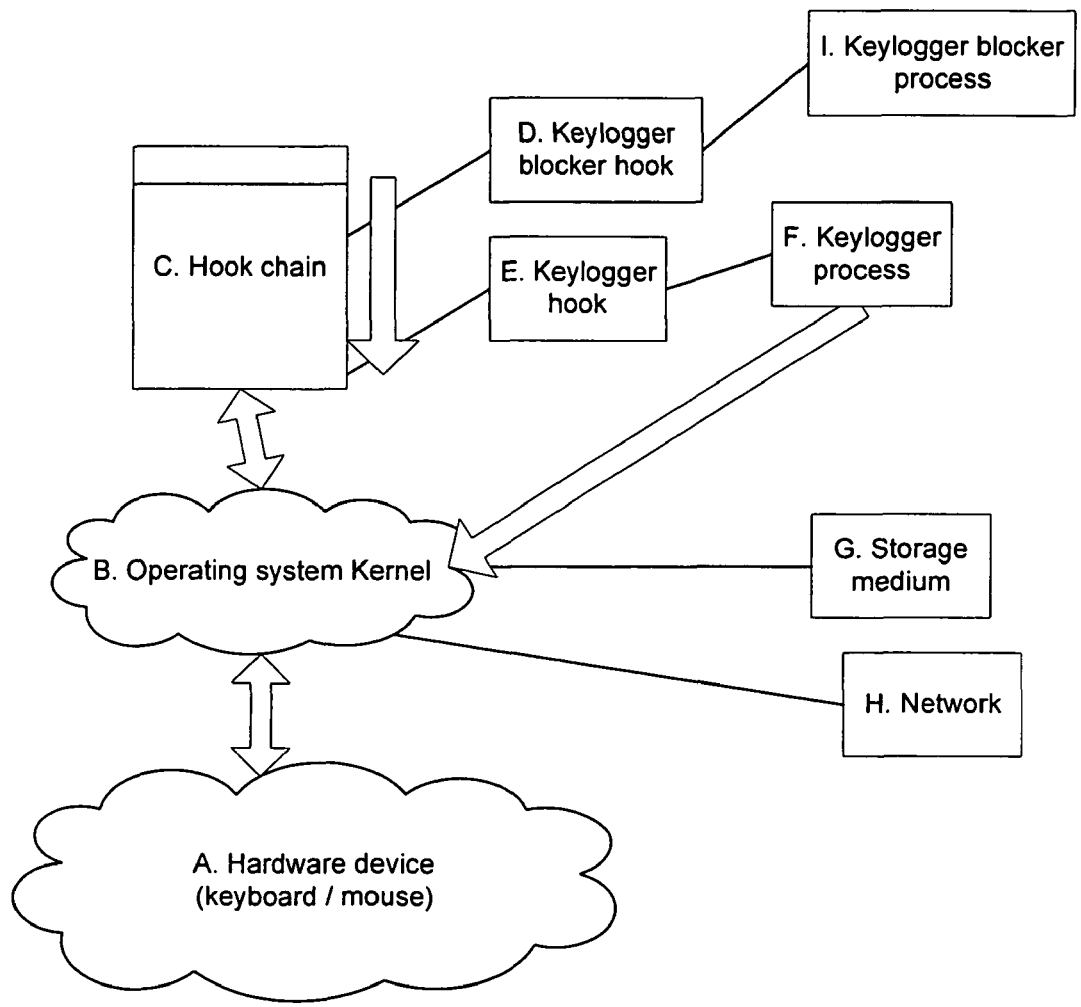
FIG. 1 illustrates a system structure used by presently known behaviour based keylogger blockers.
Figure 2:
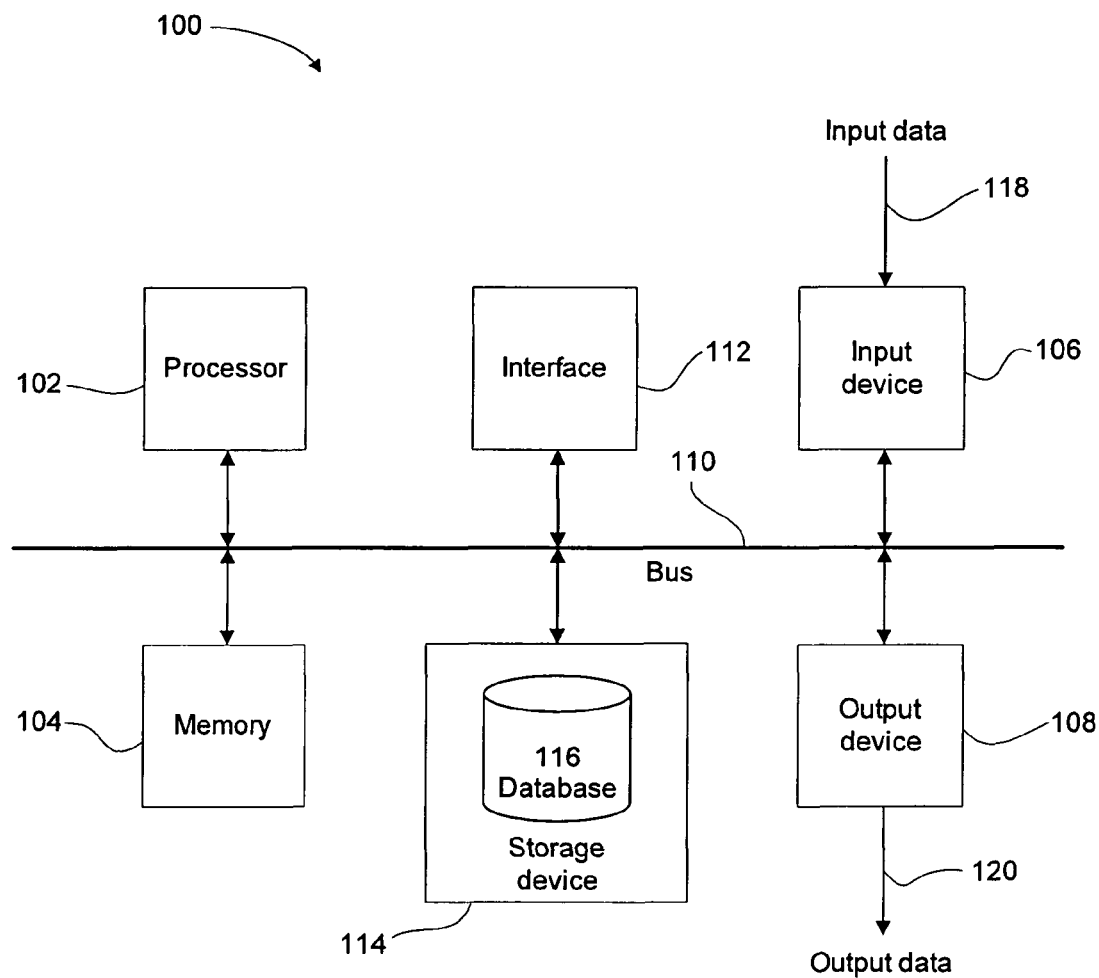
FIG. 2 illustrates an example functional block diagram of a processing system that can be utilised to embody or give effect to a particular embodiment.

A particular embodiment of the present invention can be realised using a processing system, an example of which is shown in FIG. 2. In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

The processing system 100 may be a part of a networked communications system. Processing system 100 could connect to network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Figure 3:
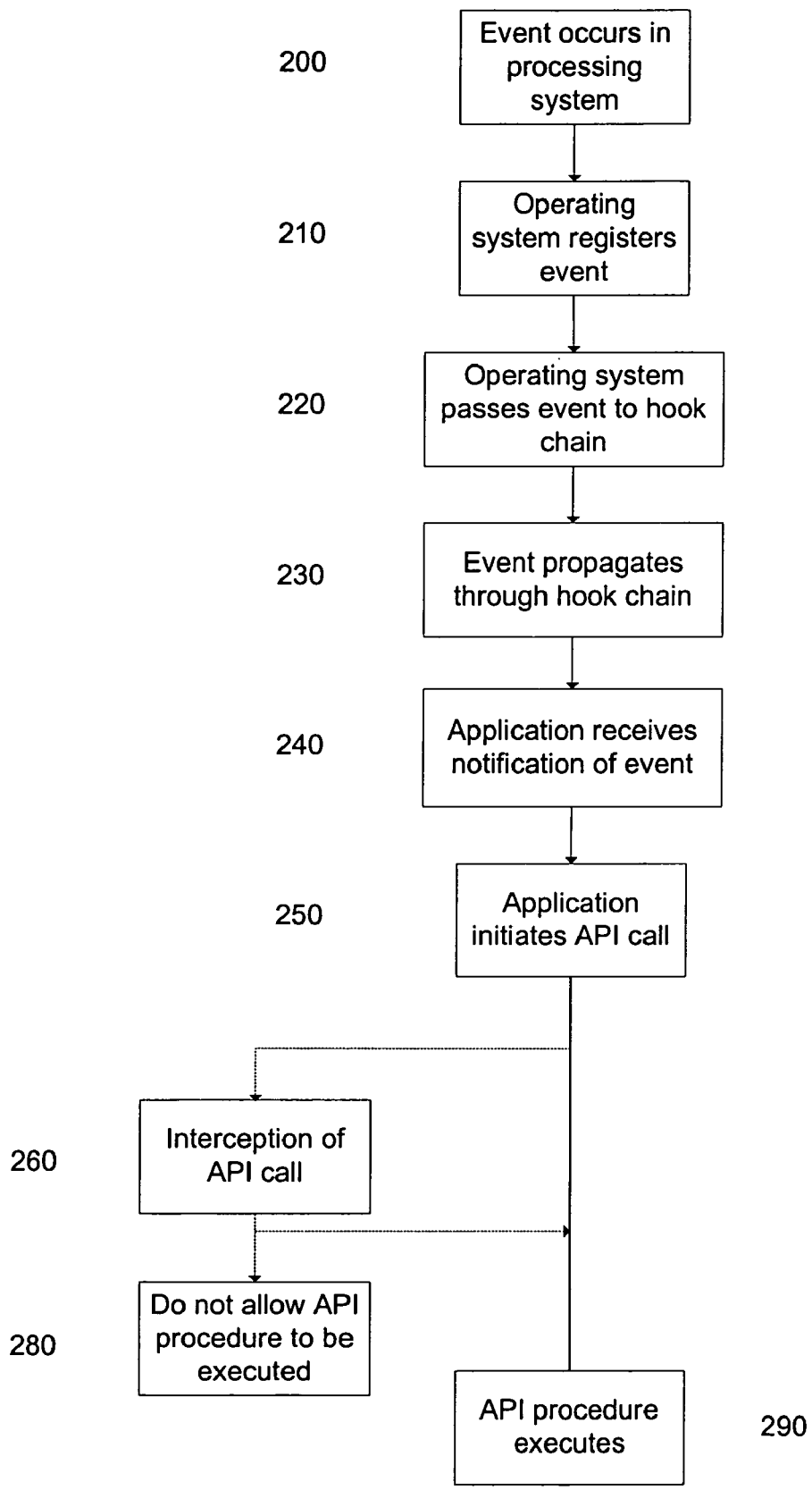
FIG. 3 illustrates a method of intercepting an API call to an API procedure.

Referring now to FIG. 3, there is illustrated an example flow chart showing the process of intercepting an API call. At step 200, an event occurs in the processing system. At step 210, an operating system running in the processing system registers the occurrence of the event. At step 220, the operating system passes the registered event to the hook chain. At step 230, the event is passed to each hook in the hook chain such that different applications, processes, and devices may be notified of the registered event. Once the event has propagated throughout the hook chain, the method comprises at step 240 an application receiving notification of the event being registered by the processing system. At step 250, the application initiates an API call to an API procedure so as to carry out a response to the registered event. If an API hook has been established between the API call and the API procedure, the API call is intercepted before it reaches the API procedure. The API call may be allowed to continue calling the API procedure at step 290 or the API call may not be passed on to the API procedure, as shown at step 280.

Figure 4:
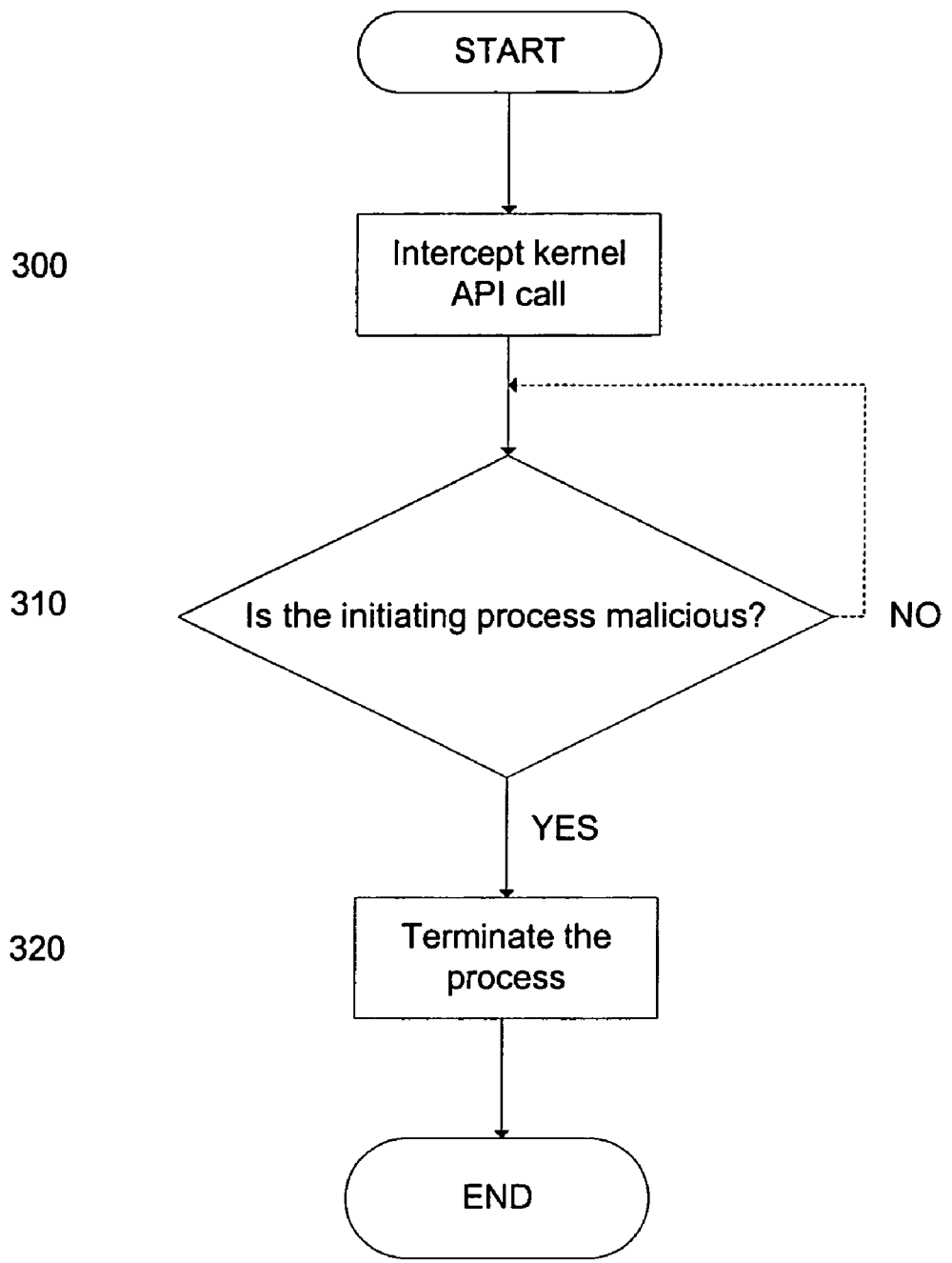
FIG. 4 illustrates an example flow diagram of a method for restricting recordal of user activity in a processing system using interception of a kernel API call for a processing system.

An example method for restricting recordal of user activity in a processing system using interception of a kernel API call will now be described with reference to FIG. 4.

In particular, at step 300, the method comprises intercepting a kernel API call. Then at step 310, the method comprises determining if a process initiating the kernel API call is malicious. If the process is determined to be malicious, the method comprises terminating the determined process at step 320. If the process is determined not to be malicious, the method may optionally return to the beginning of the method and continue to determine whether any other processes are malicious.

A more detailed example of a method for restricting recordal of user activity in a processing system using interception of kernel API calls will now be described with reference to FIG. 5.

In particular, at step 400, the processing system is configured to intercept a kernel API call. The kernel API call may or may not be intercepted in processes system wide, although usually this may be done system-wide. However, a person skilled in the art will appreciate that it is not essential that the kernel API call be system-wide.

At step 410, the behaviour of the process is analysed to determine if the process is suspicious. This may comprise for example determining if the API call is GUI or non-GUI related, whether the process comprises a hidden window, comparing the process to signatures of known keylogger programs, and comparing the process to other common behavioural traits of keylogger software. If the process is determined to be suspicious, the method moves to step 420.

At step 420, the method comprises the processing system determining whether the initiating process of the intercepted API call is malicious based on the results of step 410. If the processing system determines that based on the behavioural analysis the initiating process is malicious the method moves to step 430, otherwise, the API call is passed to the API procedure, as shown at step 460 and the method returns to intercepting other kernel API calls at step 400.

At step 430, the method comprises identifying the requesting or initiating process. Thus, process information is generated in regard to the particular process, wherein the process information may comprise at least one of: a name of the process, a process identity number, a user that the process belongs, a time the process was started, a parent process identity number, associated processing cycles for the process, and/or any associated open port number.

At step 440, the method comprises the determined process being terminated or killed. Therefore, the process stops requesting notification of the particular event occurring. For example, if the determined malicious process were a keylogger attempting to establish a hook in the hook chain to subsequently record keystrokes, the process would be restricted from being inserted into the hook chain.

Optionally (as indicated by the dotted outline), at step 450, the user may be notified of the determined process, and its subsequent termination. Additionally, the user may be prompted to authorise the termination of determined process. Optionally, the generated process information and determined parameters may be stored in file stored in the processing system's data store, such that a record of the terminated process may be subsequently viewed by a user.

Figure 6:
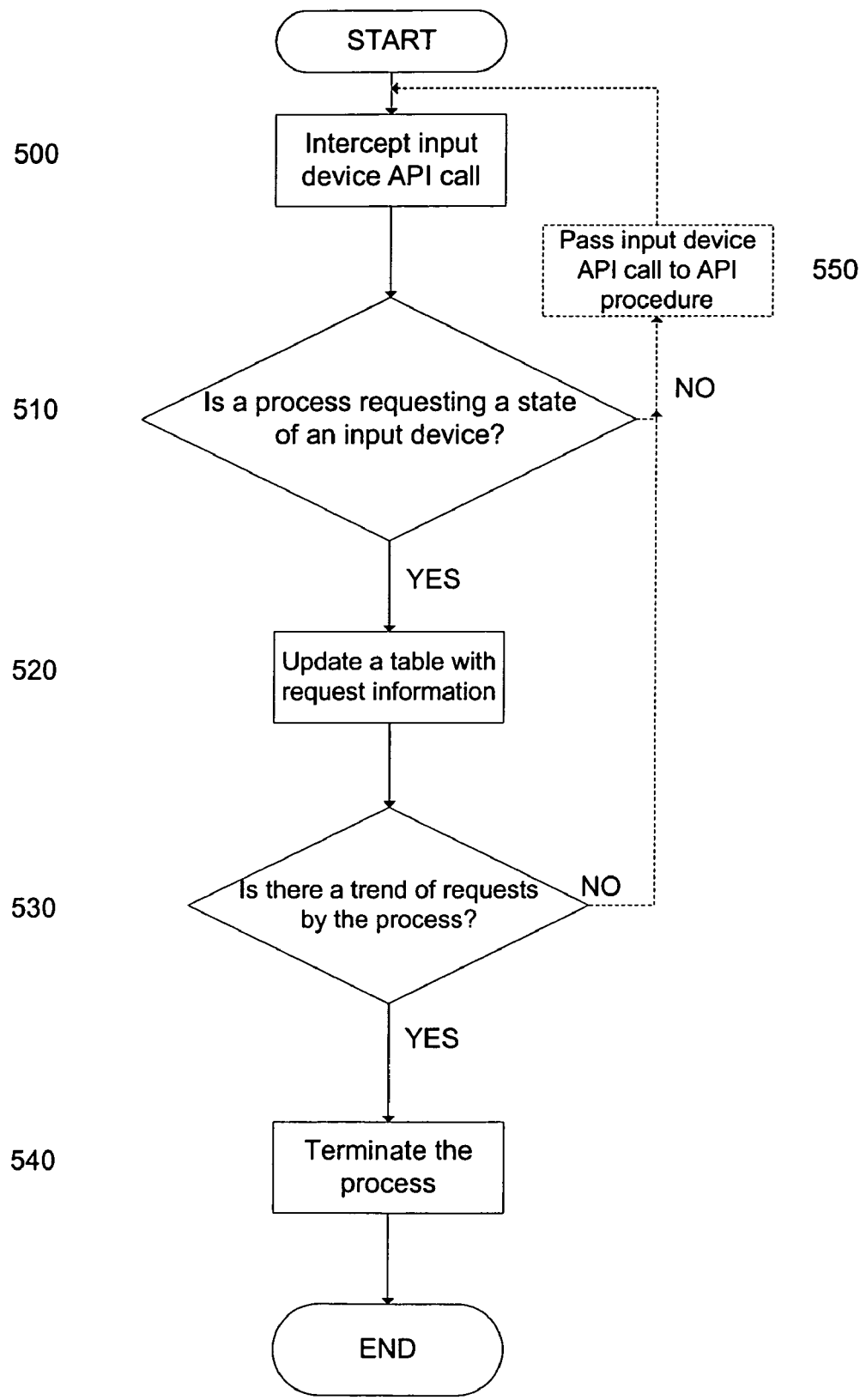
FIG. 6 illustrates an example flow diagram of a method for restricting recordal of user activity in a processing system using interception of an input device API call for a processing system.

An example method for restricting recordal of user activity in a processing system using interception of an input device API call for the processing system will now be described with reference to FIG. 6.

In particular, at step 500, the method comprises intercepting an input device API call. Then at step 510, the method comprises determining if a process is requesting a state of an input device using the intercepted input device API.

In response to a positive determination of a process requesting the state of an input device, the method comprises at step 520, updating a table, stored in the processing system's data store, with request information related to the determined process. In response to a negative determination, the input device API call is allowed to proceed to the API procedure at step 550, and as such the method continues to intercept appropriate API calls at step 500.

At step 530, the method comprises determining if a trend of requests exists by the process. If a trend exists, the method moves to step 540 to terminate the process. Otherwise, the method optionally continues to monitor processes requesting the state of the input device at step 500.

Figure 7A:
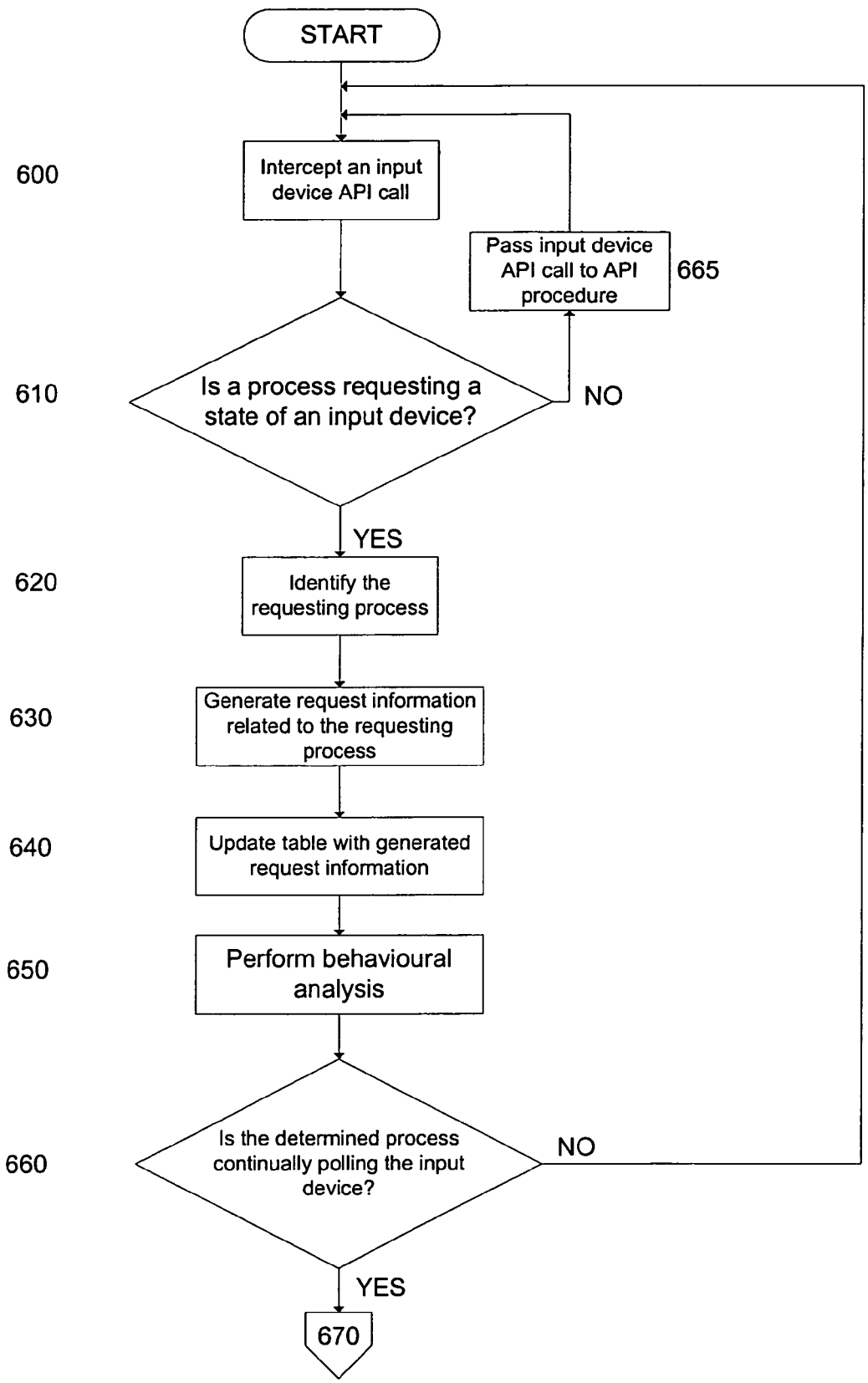
FIGS. 7A and 7B illustrate a further example of the method illustrated in FIG. 5.
Figure 7B:
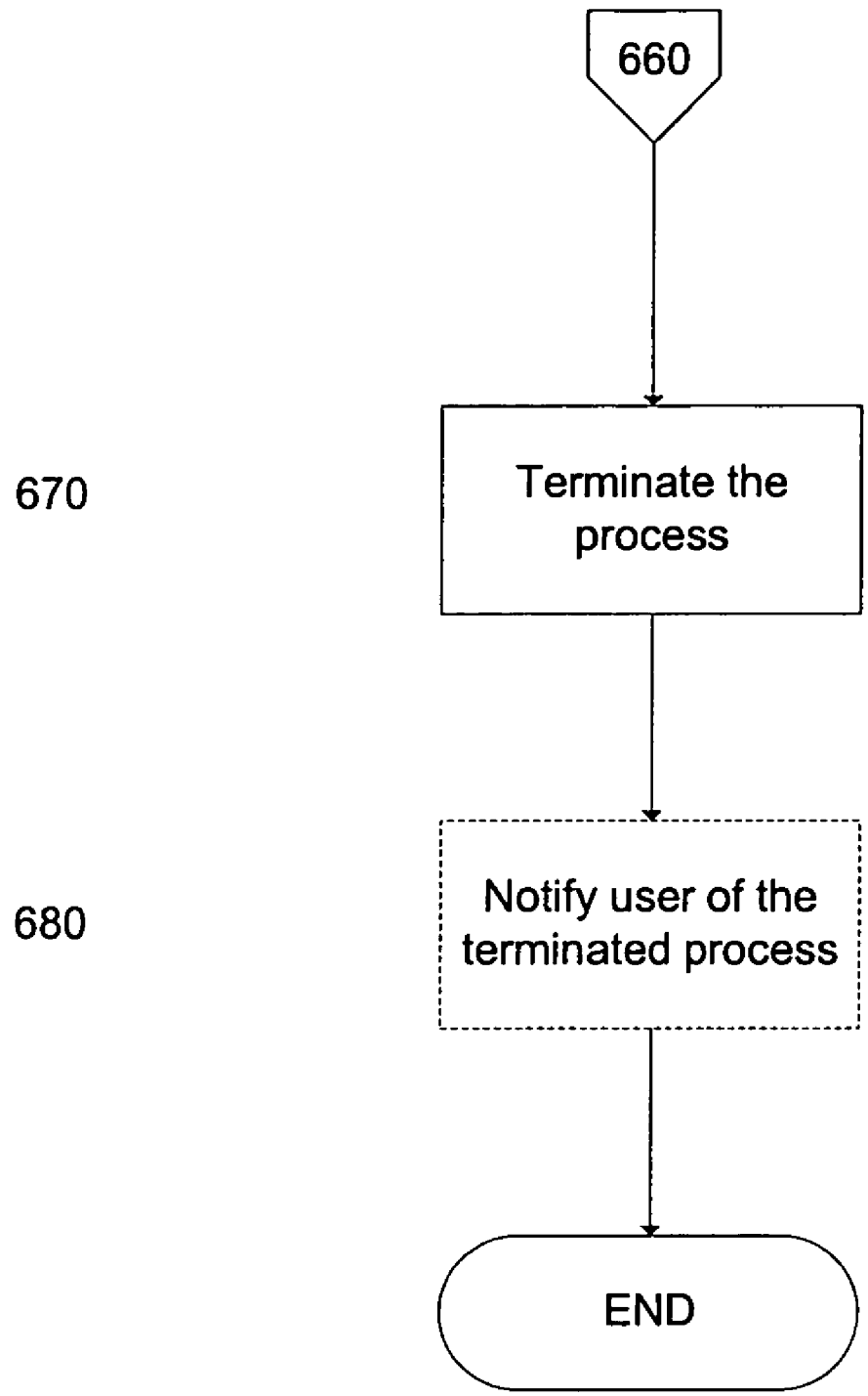

A more detailed example of a method for restricting recordal of user activity in a processing system using interception of an input device function for the processing system will now be described with reference to FIGS. 7A and 7B.

In particular, at step 600, the method comprises intercepting an input device API call. Typically, this would comprise intercepting a keyboard wide or mouse wide API call.

At step 610, the processing system is configured to determine if the initiating process of the input device API call is requesting the state of an input device, such as a keystroke pressed on a keyboard. In response to a positive determination, the method continues to step 620, otherwise the method continues to monitor processes requesting the state of the input devices being monitored.

At step 620, the method comprises determining the requesting process. This step would be similarly performed to step 420 previous discussed.

At step 630, the method comprises generating request information related to the requesting process. Thus, the process information generated in step 620 as well as parameter information may be used for generating request information for the associated process.

At step 640, the method comprises updating a table with the generated request information. The table is typically stored in the processing system's data store, i.e. memory. The table typically comprises past request information for processes that have requested the status of the monitored input devices. Therefore, the table may be used by the processing system for determining a trend in requests for the status, as performed at step 650.

At step 650, the information stored in the request information undergoes a behavioural analysis. This may comprise analysis of a continual polling of the status, polling at regular intervals, such as every tenth of a second, whether the GUI or non-GUI related, whether there is hidden windows, and other such variations of suspicious behaviour.

At step 660, the method comprises the processing system determining, using the results of the behavioural analysis, whether the initiating process is malicious. If the process is determined to not be malicious, the method continues back at step 600. However, if the process is determined to be malicious, the process is terminated at step 670.

Figure 5:
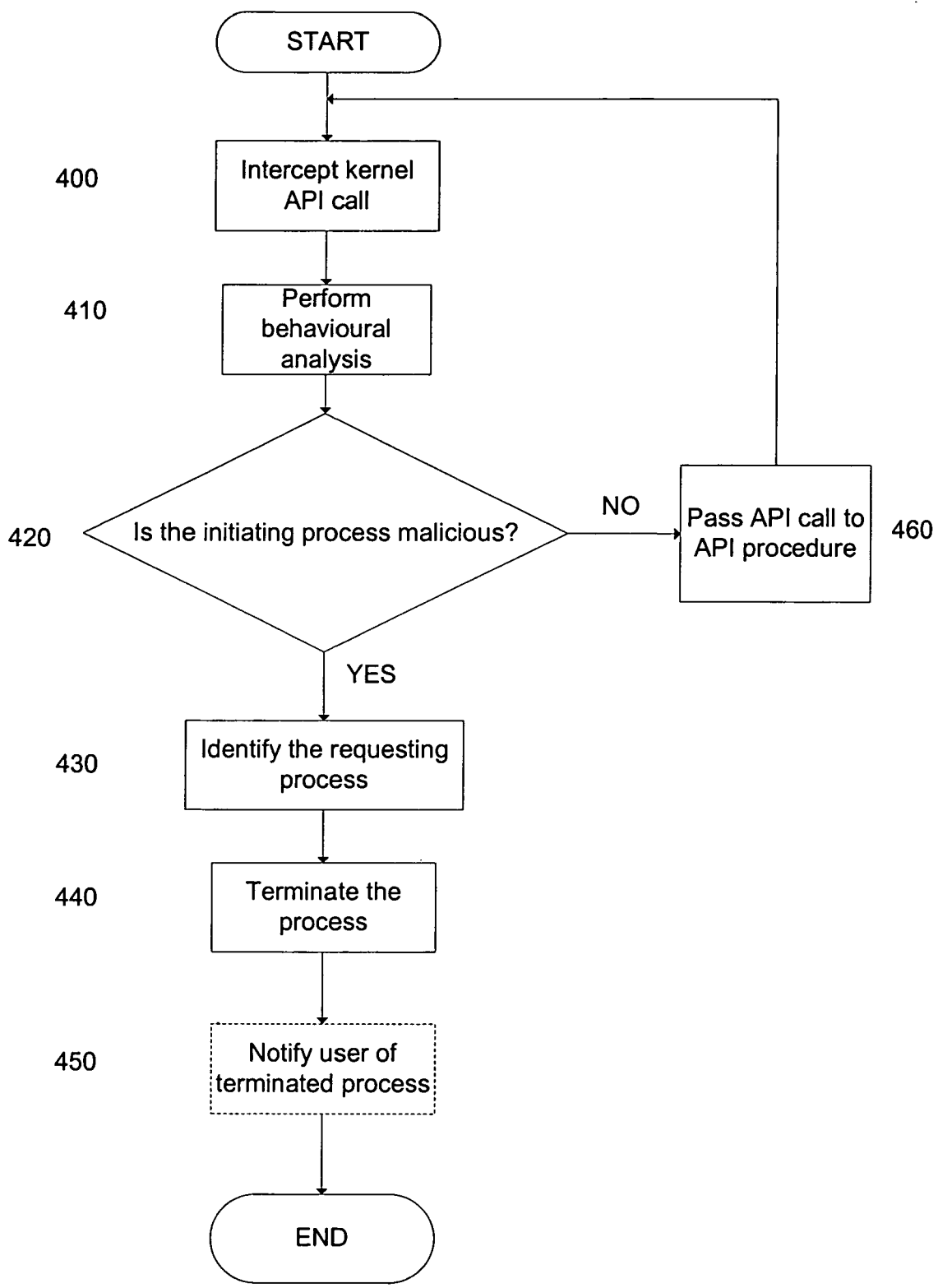
FIG. 5 illustrates a further example of the method illustrated in FIG. 3.

Optionally (as indicated by the dotted outline), at step 680 the user may be notified of the process, as earlier described in relation to FIG. 5.

Figure 8:
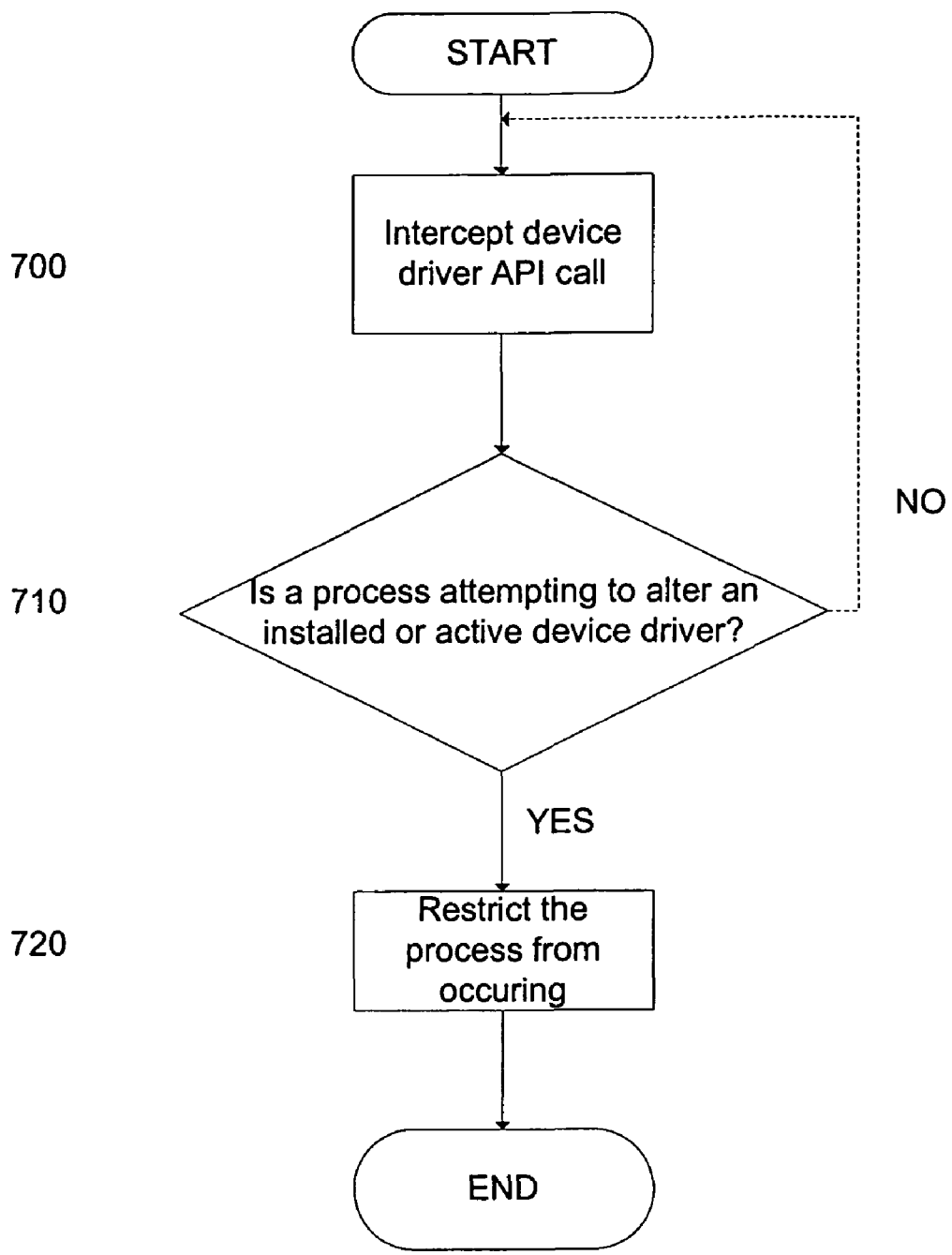
FIG. 8 illustrates an example flow diagram of a method for restricting recordal of user activity in a processing system using interception of activity related to modification of a kernel device driver API call for the processing system.

An example of a method for restricting recordal of user activity in a processing system using interception of a kernel device driver API call for the processing system will now be described with reference to FIG. 8.

In particular, at step 700, the method comprises intercepting a kernel device driver API call. Then at step 710, the method comprises determining if a process is attempting to alter a device driver using the intercepted device driver API call. In response to a positive determination of a process attempting to maliciously alter the device driver, the method comprises restricting the process from calling the API procedure at step 720.

Figure 9A:
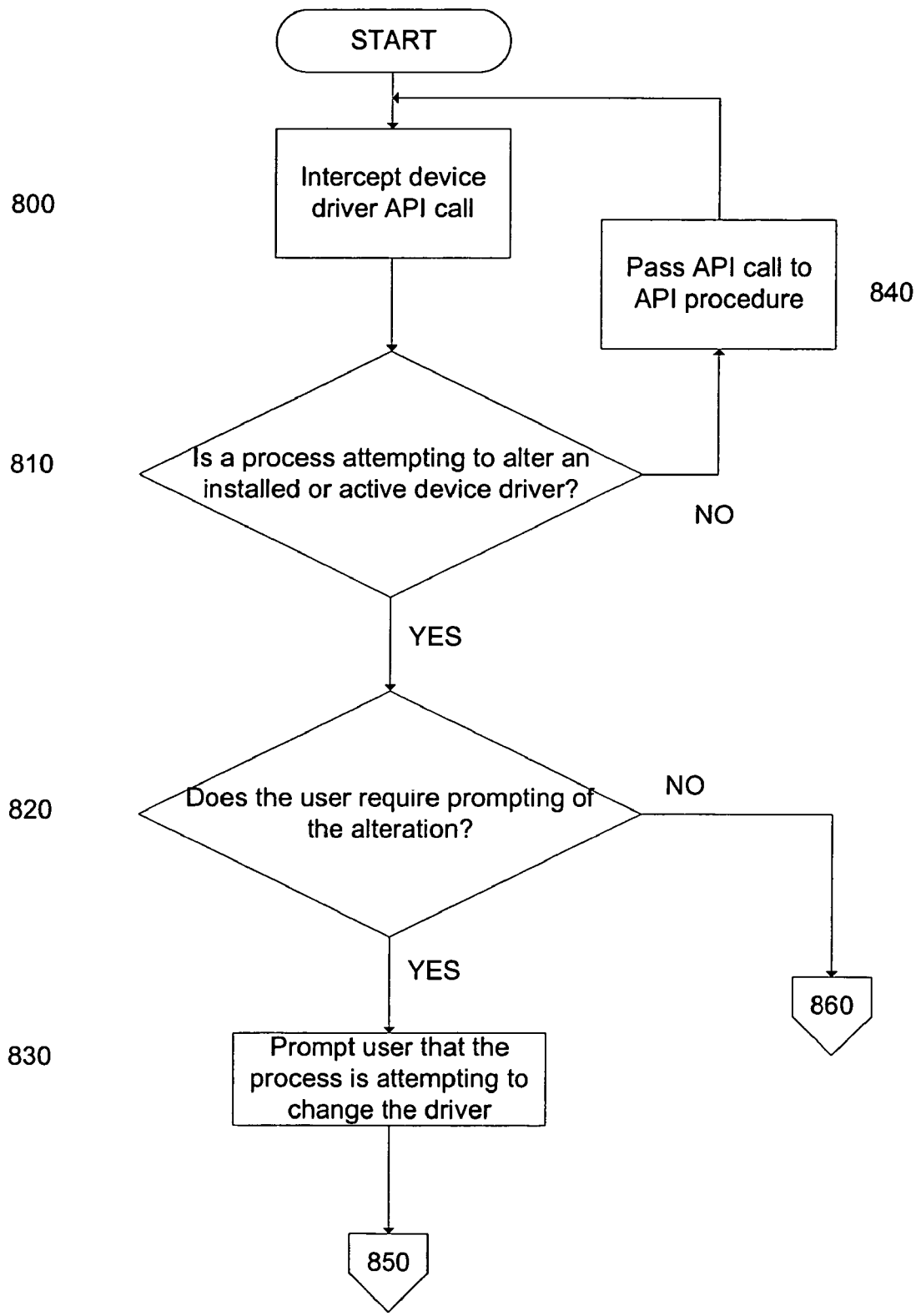
FIGS. 9A and 9B illustrate a further example of the method illustrated in FIG. 7.
Figure 9B:
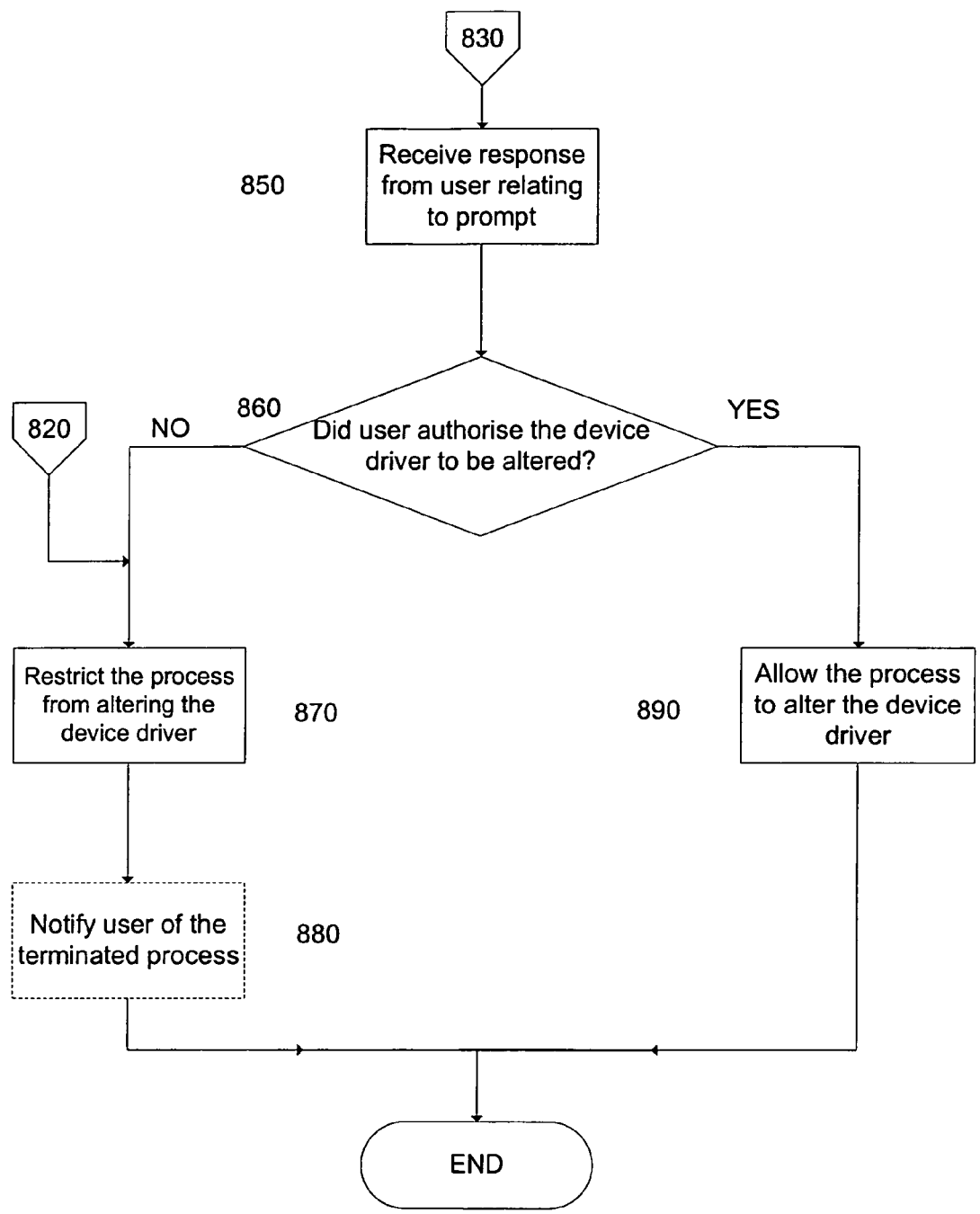

A more detailed example of a method for restricting recordal of user activity in a processing system using interception of a kernel device driver API call for the processing system will now be described with reference to FIGS. 9A and 9B.

In particular, at step 800, the method comprises intercepting a kernel device driver API call. Therefore, any attempted modification, alteration, replacement, or deletion of a device driver is intercepted, such as the alteration of a mouse or keyboard driver.

At step 810, the method comprises determining whether a process initiating the API call is attempting to alter a device driver. In response to a positive determination, the method continues to step 820, otherwise the method continues to monitor any intercepted processes that may be altering a device driver.

At step 820, the method comprises determining if the user requires a prompt regarding the determined process attempting to alter the device driver. If the user requires prompting, the method moves to step 830, otherwise the API call is passed to the API procedure at step 840 and the method continues to step 800 where kernel device driver API calls are continued to be intercepted.

Thus, at step 830, a prompt may be displayed comprising for example a graphical window, warning of the determined process and requesting the user to provide a response to the prompt. The prompt may request an indication as to whether the user wishes to proceed with allowing the process to alter the device driver.

At step 850, the processing system receives a response from the user regarding the prompt. At step 860, the method comprises determining using the received response, whether the user wishes to allow the process to continue altering the device driver. In response to the user indicating that the user does wish to allow the process to continue altering the device driver, the API call is passed to the API procedure, as illustrated by step 890. However, if the user indicated that the device driver is not to be altered, the method moves to step 870.

At step 870, the method comprises restricting the process from altering the device driver by not allowing the API call passing to the API procedure.

At step 880, the method optionally comprises notifying the user of the terminated process, similarly described to step 450.

Figure 10:
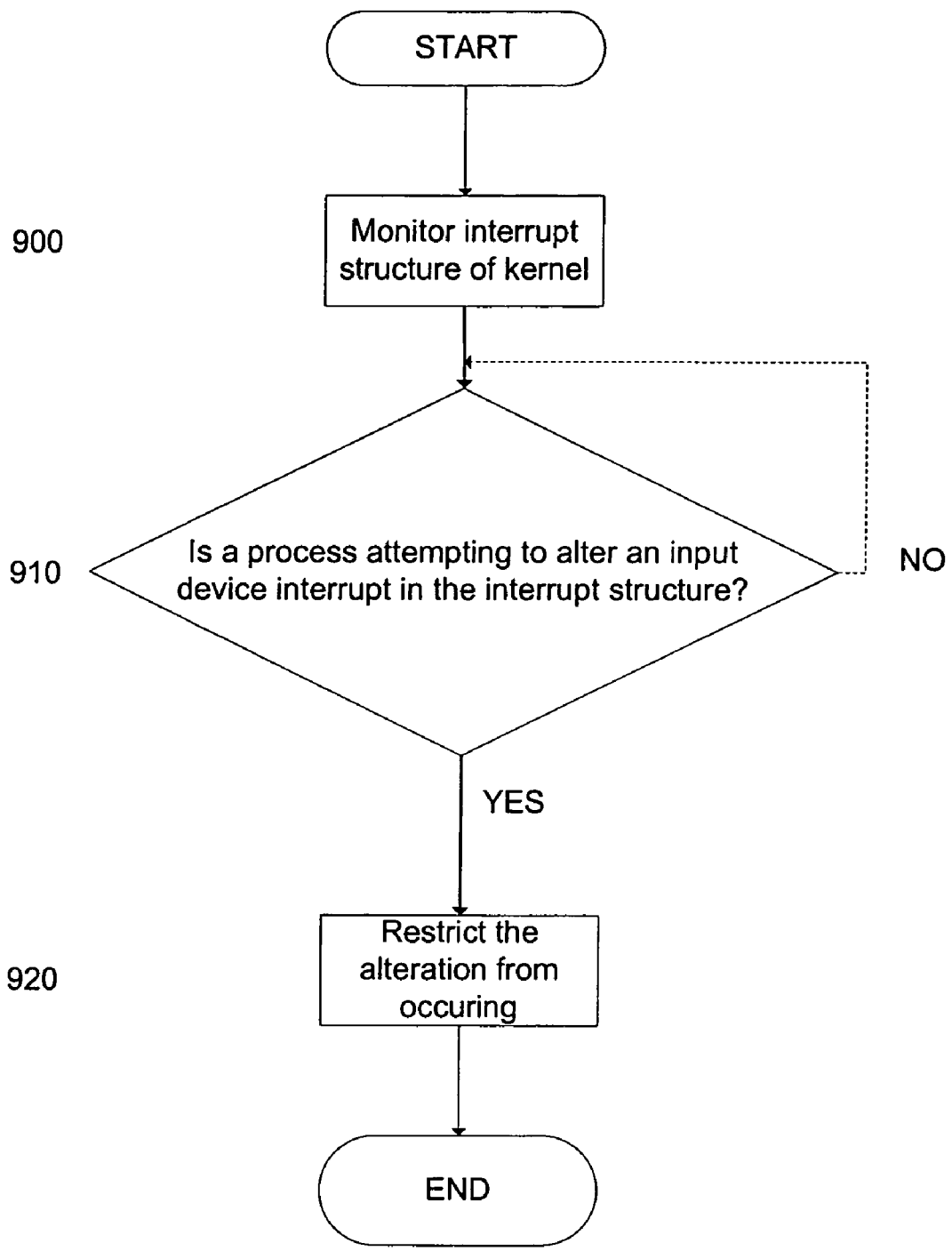
FIG. 10 illustrates an example flow diagram of a method for restricting recordal of user activity in a processing system by monitoring an interrupt structure of a kernel for the processing system.

An example of a method for restricting recordal of user activity in a processing system by monitoring an interrupt structure of a kernel for the processing system will now be described with reference to FIG. 10.

In particular, at step 900 the method comprises monitoring the interrupt structure of the operating system kernel. This allows for particular interrupts associated with redirecting parameters associated with keystrokes to malicious programs.

This may comprise for example intercepting a hook for writing to relevant kernel structures.

Alternatively, this may comprise for example the kernel structure being read and stored in a global internal table, and additionally a temporary internal table is created which can be compared to the global table repeatedly to determine if an alteration has occurred.

At step 910, the method comprises determining whether a process is attempting to alter an input device interrupt in the interrupt structure. In response to determining that the process is attempting to alter the input device interrupt, the method comprises at step 920 restricting the process from altering the interrupt structure, and thus restricting parameters such as keystrokes to be recorded.

This may comprise for example, restricting the next hook in the hook chain from being called as this method restricts the kernel structure from being altered. The user may be notified of a process being restricted from altering the kernel structure.

Alternatively, this may comprise for example comparing the internal temporary table to the global table. If a change has occurred in the temporary table, a comparison to the global table may determine a discrepancy, and as a result of this determination, the global table is written back to the kernel structures. Additionally, the user may be notified of the restriction of a process altering the kernel structures.

It will be appreciated by the person skilled in the art, that any combination of keylogger blocking methods described in FIGS. 3 through to 10 may be used together in order to increase the success of detecting a keylogger program.

Figure 11A:
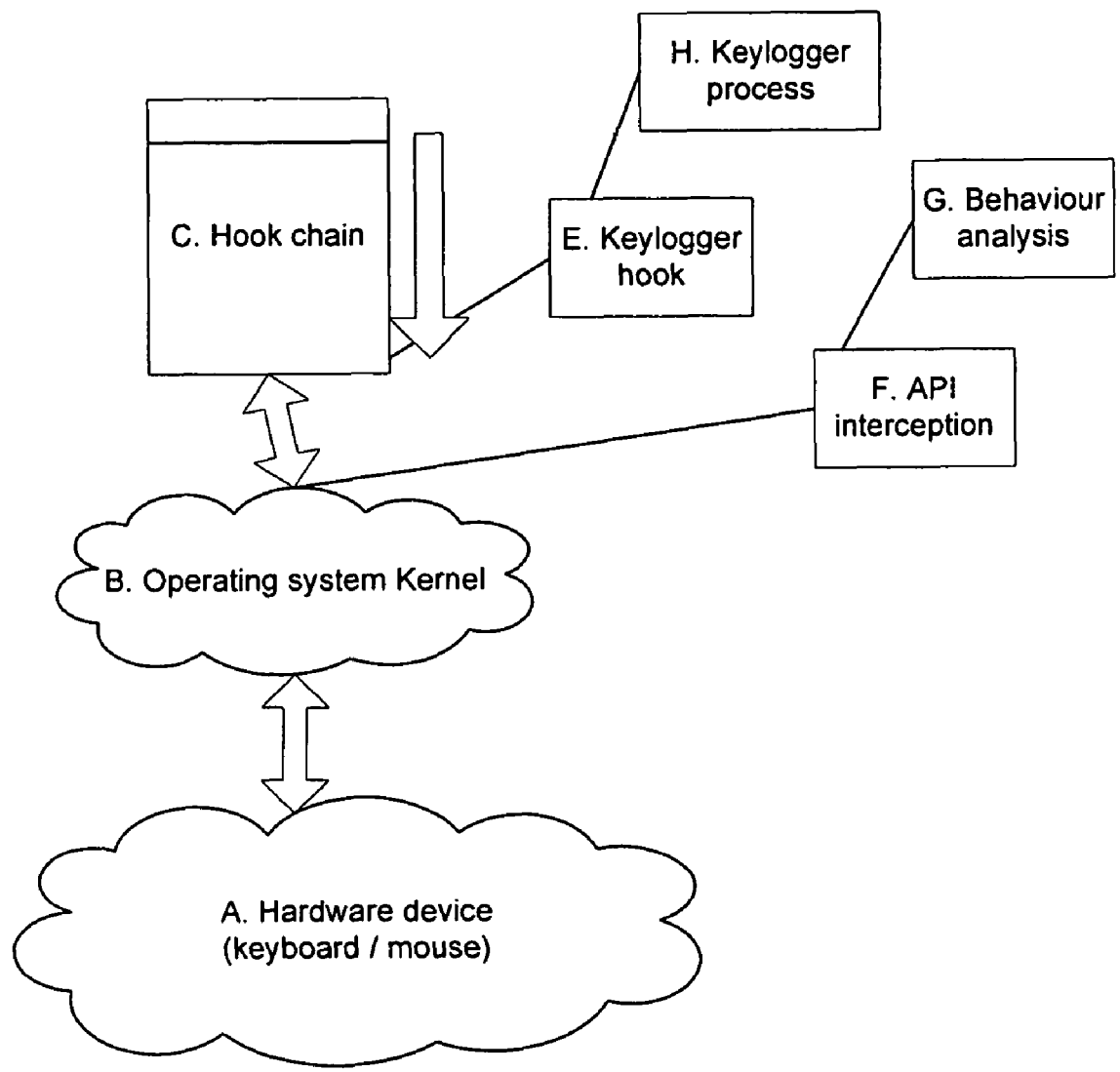
FIGS. 11A, 11B and 11C illustrate example system structures that can be utilised to embody or give effect to various embodiments of behaviour based keylogger blockers.
Figure 11B:
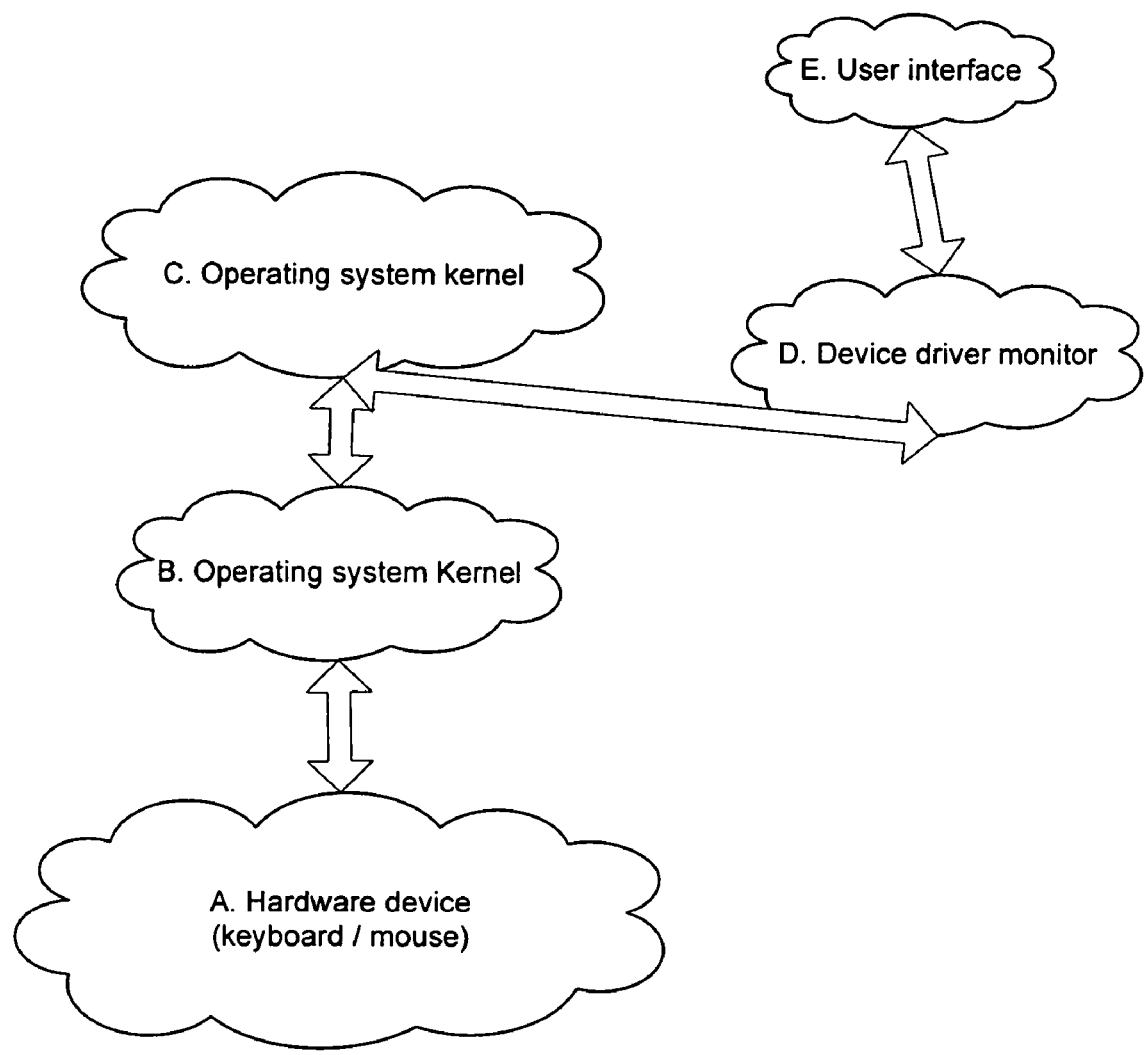
Figure 11C:
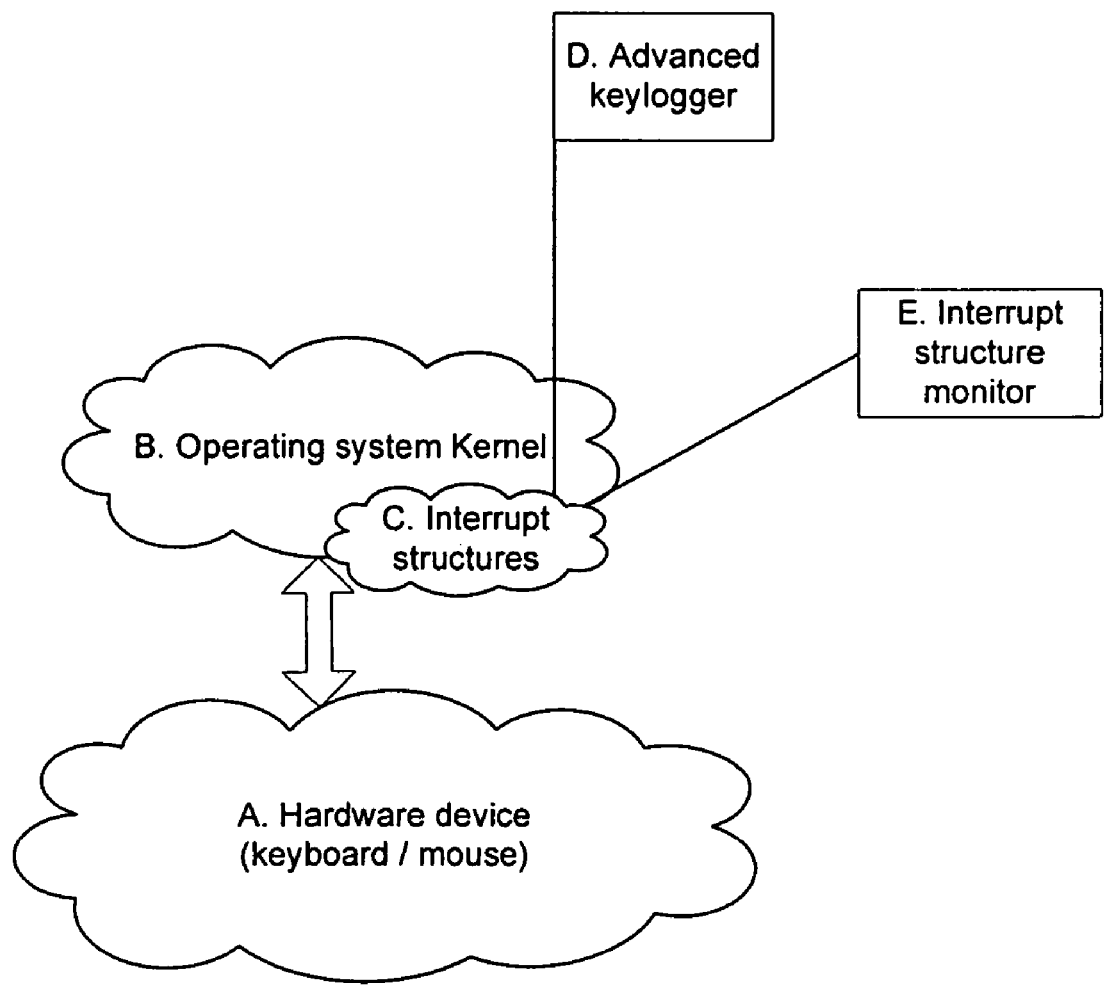

Referring now to FIGS. 11A to 11C, there are illustrated example system structures that provide various embodiments of behaviour based keylogger blockers.

Illustrated in FIG. 11A is a system for providing a keylogger blocker based on kernel API call interception. The keylogger components of keylogger software are prevented from functioning correctly by examining keylogger behaviour, blocking 'suspicious' activity by preventing the keylogger establishing a hook in the hook chain and terminating the suspicious process. This can be achieved as follows:

1) Intercept the operating system kernel's API calls and keyboard/mouse state API calls (F);

2) On any calls to the kernel APIs (B), examine specified parameters and determine whether a process is malicious. If this is the case, terminate the calling process (H) and optionally notify the user; and, 3) On any calls to the keyboard/mouse state APIs (B) update an internal table (stored at either (F) or (G)). This table can contain the calling process and last request for information using the API. If it is determined that the exhibited behaviour is suspicious, then the calling process (H) is terminated and the user is optionally notified.

Determining whether calls to state APIs are suspicious can be achieved by constant, periodic, or routine (eg. intermittent but with a short and somewhat constant timeframe) polling of the keyboard state.

An example of pseudocode that may be used for providing a keylogger blocker based on API interception is shown below.

```
main PROCEDURE
    CALL function to set up interception of system API
    IF a call to intercepted system API
        THEN execute interceptEvent PROCEDURE
END
interceptEvent PROCEDURE
    CALL behaviour analysis procedure
    IF behaviour analysis procedure returns OK
        THEN pass parameters to intended system API
            return result
    ELSE
        terminate calling process
        notify user with terminated process's details
END
```

Illustrated in FIG. 11B is a system for providing a keylogger blocker based on driver interception and/or substitution. Keyboard loggers may replace the system keyboard driver with their own code which, apart from controlling the keyboard directly or indirectly, can be used to record all keys pressed by a user. This behaviour can be detected and prevented as follows:

1) Intercept the operating system kernel's device driver APIs (D); and,

2) On any calls to update, replace or change the active keyboard or mouse driver (B) either:
   a) Prevent the action and optionally notify the user (E); or,
   b) Prompt the user (E) as to whether the change should be allowed and process the system request accordingly.

Illustrated in FIG. 11C is a system for providing a keylogger blocker based on kernel mode interrupt. More advanced keyboard loggers may use undocumented or exploitable features of an operating system kernel to set up or install code which is called whenever the keyboard hardware interrupt is invoked. Internal kernel structures can be monitored and any changes to the keyboard interrupt handler can be prevented as follows:

1. Set up monitoring (E) of internal interrupt structures (C) within the kernel; and,
2. Prevent, using the interrupt structure monitor (E), any modifications to internal interrupt structures (C) thereby preventing the keylogger (D) from activating itself.

A first example of pseudocode that may be used for providing a keylogger blocker based on kernel mode interrupt is shown below.

```
main PROCEDURE
    intercept attempted writes to relevant kernel structures
    IF an attempted write to relevant kernel structure
        THEN execute onWriteAttempt PROCEDURE
END
onWriteAttempt PROCEDURE
    prevent write attempt
    notify user with details
END
```

A second example of pseudocode that may be used for providing a keylogger blocker based on kernel mode interrupt is shown below.

```
main PROCEDURE
    read kernel structures and store in global internal table
    CALL thread PROCEDURE to monitor changes to kernel structures
END
thread PROCEDURE
```

```
REPEAT until system shut down
    read kernel structures and store in temporary internal table
    compare temporary table to global table
    IF tables do not match
        THEN write global table to kernel structures
            notify user with details
END REPEAT
END
```

The embodiments illustrated in FIGS. 11A to 11C may be implemented separately or in any combination as a software package or component. Such software can then be used to pro-actively seek to prevent any malicious software based keylogger from being invoked on a terminal. Various embodiments can be implemented for use with the Microsoft Windows operating system or any other modern operating system.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A method of restricting recordal of user activity in a processing system, the method comprising:
    establishing an application programming interface (API) hook between API calls and API procedures of the processing system;
    registering an occurrence of an event in the processing system;
    notifying one or more processes in a hook chain of the occurrence of the event;
    notifying a process that is not in the hook chain of the occurrence of the event;
    intercepting a kernel API call of the processing system, wherein the kernel API call is initiated by the process that is not in the hook chain;
    determining if the process initiating the kernel API call is malicious, wherein the process is a keylogger program; and,
    in response to a positive determination;
        determining parameters of the intercepted kernel API call, wherein the parameters comprise information relating to a request for an API procedure of the processing system;
        generating process information for the process initiating the kernel API call, wherein the process information comprises:
            identity information for the process; and
            the determined parameters of the intercepted kernel API call;
        generating a file comprising the process information;
        storing the file in a storage device, wherein the storage device stores additional files that comprise process information for additional processes that initiated malicious kernel API calls;
    performing a behavioral analysis of the process by continually polling the state of the file in the storage device;
    preventing the process from establishing a hook function in the hook chain of the processing system based on the behavioral analysis;
    terminating the process;
    notifying a user in real-time when the process is terminated; and
    displaying a list of previously terminated processes to the user, wherein the list is generated from the files stored in the storage device.

2. The method according to claim 1, wherein determining if the process is malicious comprises checking if the API call is related to a user interface.

3. The method according to claim 1, wherein determining if the process is malicious comprises checking if the API call is related to a graphical user interface.

4. The method according to claim 1, wherein determining if the process is malicious comprises checking if the process comprises a hidden window.

5. The method according to claim 1, wherein determining if the process is malicious comprises comparing the process to one or more signatures of known keylogger programs.

6. The method according to claim 1, wherein, in response to a positive determination of a malicious process, the method comprises identifying the process.

7. The method according to claim 6, wherein the process is identified by at least one of: a name of the process; a process identity; a user with which the process is associated; a time the process was initiated; a parent process identity number; a processing cycle for the process; and, one or more associated open port numbers.

8. The method according to claim 1, wherein prior to the process being terminated, the method comprises prompting a user to authorize the termination of the process.

9. A processing system for restricting recordal of user activity in the processing system, comprising:
    a processor;
    memory in electronic communication with the processor;
    the processor configured to:
        establish an application programming interface (API) hook between API calls and API procedures of the processing system;
        register an occurrence of an event in the processing system;
        notify one or more processes in a hook chain of the occurrence of the event;
        notifying a process that is not in the hook chain of the occurrence of the event;
        intercept a kernel API call of the processing system, wherein the kernel API call is initiated by the process that is not in the hook chain;
        determine if the process initiating the kernel API call is malicious, wherein the process is a keylogger program; and,
        in response to a positive determination, the processor further configured to:
            determine parameters of the intercepted kernel API call, wherein the parameters comprise information relating to a request for an API procedure of the processing system;
            generate process information for the process initiating the kernel API call, wherein the process information comprises:
                identity information for the process; and the determined parameters of the intercepted kernel API call;
generate a file comprising the process information;
store the file in a storage device, wherein the storage device stores additional files that comprise process information for additional processes that initiated malicious kernel API calls;
perform a behavioral analysis of the process by continually polling the state of the file in the storage device;
prevent the process from establishing a hook function in the hook chain of the processing system based on the behavioral analysis;
terminate the process;
notify a user in real-time when the process is terminated; and
display a list of previously terminated processes to the user,
wherein the list is generated from the files stored in the storage device.

10. A method of restricting recordal of user activity in a processing system, the method comprising:
establishing an application programming interface (API) hook between API calls and API procedures of the processing system;
registering an occurrence of an event in the processing system;
notifying one or more processes in a hook chain of the occurrence of the event;
notifying a process that is not in the hook chain of the occurrence of the event;
intercepting an input device API call of the processing system, wherein the input device API call is initiated by the process that is not in the hook chain;
determining if the process initiating the input device API call is requesting a state of the input device in the processing system, wherein the process is a keylogger program; and,
in response to a positive determination:
determining parameters of the intercepted input device API call, wherein the parameters comprise information relating to a request for an API procedure of the processing system;
generating process information for the process initiating the input device API call, wherein the process information comprises:
identity information for the process; and
the determined parameters of the intercepted input device API call;
generating a file comprising the process information;
storing the file in a storage device, wherein the storage device stores additional files that comprise process information for additional processes that initiated malicious input device API calls;
updating a table with request information of the process, wherein the request information comprises the process information;
performing a behavioral analysis of the process by continually polling the state of the file in the storage device;
preventing the process from establishing a hook function in the hook chain of the processing system based on the behavioral analysis;
terminating the process;
notifying a user in real-time when the process is terminated; and
displaying a list of previously terminated processes to the user, wherein the list is generated from the files stored in the storage device.

11. The method according to claim 10, wherein the method comprises intercepting the API call for at least one of the following input devices:
a keyboard; and,
a mouse.

12. The method according to claim 10, wherein the process is identified by at least one of: a name of the process; a process identity; a user with which the process is associated; a time the process was initiated; a parent process identity number; a processing cycle for the process; and, one or more associated open port numbers.

13. The method according to claim 10, wherein the request information comprises at least one of:
the name of the process;
the process identity;
the user with which the process is associated;
the time the process was initiated;
the parent process identity number;
associated processing cycles for the process; and,
one or more associated open port numbers.

14. The method according to claim 10, wherein prior to the process being terminated, the method comprises prompting a user to authorize the termination of the process.

15. A processing system for restricting recordal of user activity in the processing system, comprising:
a processor;
memory in electronic communication with the processor;
the processor configured to:
establish an application programming interface (API) hook between API calls and API procedures of the processing system;
register an occurrence of an event in the processing system;
notify one or more processes in a hook chain of the occurrence of the event;
notifying a process that is not in the hook chain of the occurrence of the event;
intercept an input device API call of the processing system, wherein the input device API call is initiated by the process that is not in the hook chain;
determine if the process initiating the input device API call is requesting a state of the input device in the processing system, wherein the process is a keylogger program; and,
in response to a positive determination, the processor further configured to:
determine parameters of the intercepted input device API call, wherein the parameters comprise information relating to a request for an API procedure of the processing system;
generate process information for the process initiating the input device API call, wherein the process information comprises:
identity information for the process; and
the determined parameters of the intercepted input device API call;
generate a file comprising the process information;
store the file in a storage device, wherein the storage device stores additional files that comprise process information for additional processes that initiated malicious input device API calls;
update a table with request information of the process, wherein the request information comprises the process information;

perform a behavioral analysis of the process by continually polling the state of the file in the storage device;
prevent the process from establishing a hook function in the hook chain of the processing system based on the behavioral analysis;
terminate the process;
notify a user in real-time when the process is terminated; and
display a list of previously terminated processes to the user, wherein the list is generated from the files stored in the storage device.

16. A method of restricting recordal of user activity in a processing system, the method comprising:
establishing an application programming interface (API) hook between API calls and API procedures of the processing system;
registering an occurrence of an event in the processing system;
notifying one or more processes in a hook chain of the occurrence of the event;
notifying a process that is not in the hook chain of the occurrence of the event;
intercepting a kernel device driver API call of the processing system, wherein the kernel device driver API call is initiated by the process that is not in the hook chain;
determining if the process initiating the kernel device driver API is attempting to perform an activity comprising at least one of:
replacement of an input device driver;
modification of an input device driver; and,
deletion of an input device driver; and,
in response to a positive determination:
determining parameters of the intercepted kernel device driver API call, wherein the parameters comprise information relating to a request for an API procedure of the processing system;
generating process information for the process initiating the kernel device driver API call, wherein the process information comprises:
identity information for the process; and
the determined parameters of the intercepted kernel device driver API call;
generating a file comprising the process information;
storing the file in a storage device, wherein the storage device stores additional files that comprise process information for additional processes that initiated malicious kernel device driver API calls;
performing a behavioral analysis of the process by continually polling the state of the file in the storage device;
preventing the process from establishing a hook function in the hook chain of the processing system based on the behavioral analysis;
restricting the process from performing the activity;
notifying a user in real-time when the process is restricted, wherein the process is a keylogger program; and
displaying a list of previously terminated processes to the user, wherein the list is generated from the files stored in the storage device.

17. The method according to claim 16, wherein the method comprises intercepting the kernel device driver API call for at least one of the following input devices:
a keyboard; and,
a mouse.

18. The method according to claim 16, additionally comprising determining if a user prompt is to be displayed to a user warning the user of the process attempting to perform the activity.

19. The method according to claim 18, wherein the user prompt requests a response indicating whether the process is permitted to perform the activity, and the method comprises receiving response data indicating whether the user has permitted the activity to be performed by the process.

20. A processing system for restricting recordal of user activity in the processing system comprising:
a processor;
memory in electronic communication with the processor;
the processor configured to:
establish an application programming interface (API) hook between API calls and API procedures of the processing system;
register an occurrence of an event in the processing system;
notify one or more processes in a hook chain of the occurrence of the event;
notify a process that is not in the hook chain of the occurrence of the event;
intercept a kernel device driver API call of the processing system, wherein the kernel device driver API call is initiated by the process that is not in the hook chain;
determine if the process initiating the kernel device driver API call is attempting to perform an activity comprising at least one of:
a replacement of an input device driver;
a modification of an input device driver; and
deletion of an input device driver; and
in response to a positive determination, the processor further configured to:
determine parameters of the intercepted kernel device driver API call, wherein the parameters comprise information relating to a request for an API procedure of the processing system;
generate process information for the process initiating the kernel device driver API call, wherein the process information comprises:
identity information for the process; and
the determined parameters of the intercepted kernel device driver API call;
generate a file comprising the process information;
store the file in a storage device, wherein the storage device stores additional files that comprise process information for additional processes that initiated malicious kernel device driver API calls;
perform a behavioral analysis of the process by continually polling the state of the file in the storage device;
prevent the process from establishing a hook function in the hook chain of the processing system based on the behavioral analysis;
restrict the process from performing the activity;
notify a user in real-time when the process is restricted, wherein the process is a keylogger program; and
display a list of previously terminated processes to the user, wherein the list is generated from the files stored in the storage device.

* * * * *